Patented Aug. 29, 1944

2,356,767

UNITED STATES PATENT OFFICE 2,356,767

PROCESS OF PRODUCING POLYMERIC MATERIALS

Edward L. Kropa, Old Greenwich, Conn., assignor to American Cyanamid Company, New York, N. Y., a corporation of Maine No Drawing. Application April 26, 1940, Serial No. 331,756

7 Claims. (Cl. 260—32)

This invention relates to the production of thermoplastic polymeric materials.

The use of polymers of various unsaturated substances has previously been somewhat limited because suitable solvents for many such substances and the polymers thereof have not been known. One of these, polyacrylonitrile, is insoluble in most of the known solvents. Accordingly, this material, as well as many of the other polymeric materials produced from unsaturated compounds, has not attained any substantial commercial utilization in the production of artificial fibers, films, etc.

Previously polymerization of unsaturated compounds has been carried out in a variety of organic solvents. In certain instances aqueous emulsions have been employed. In both instances, solutions or suspensions have been formed.

An object of this invention is to provide a solvent material and to so polymerize various unsaturated materials such as acrylonitrile, that concentrated solutions of the polymeric material thus produced may be obtained.

Another object of this invention is to produce solutions of polymeric materials suitable for the production of artificial fibers, films, etc.

Still another object of this invention is to polymerize unsaturated materials in salt solutions from which the polymer may be precipitated.

These and other objects are attained by polymerizing in an aqueous solution of a zinc salt which is extremely water-soluble, a substance of the following general formula:

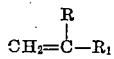

and isomers thereof, where R is hydrogen or methyl, where $R_1$ may be —CN or

where $R_2$ is hydrogen, alkyl, alkaryl, cycloakyl, or

and where $R_3$ and $R_4$ are hydrogen or organic radicals. Zinc salts suitable for the purposes of this invention are those, a unit weight of which will dissolve in less than 0.3 of a unit weight of cold water.

The following examples in which the proportions are in parts by weight are given by way of illustration and not in limitation.

Example 1

| | Parts |
|---|---|
| Zinc chloride | 72 |
| Water | 18 |
| Acrylonitrile | 10 |
| Benzoyl peroxide | 0.002 |

To a solution of the zinc chloride in the water, the acrylonitrile with the benzoyl peroxide dissolved therein is added. This composition is heated at about 90° C. for 4–5 hours during which time the solution changes to a thick viscous mass. This viscous mass is poured into a relatively large volume of water, thereby precipitating a polymeric powder. This powder may be separated by filtration, washed with water and dried. This dried material may be subjected to heat and pressure to produce molded articles having excellent chemical resistance and also being very resistant to heat. The dried powder may also be sheeted on hot mill rolls (e. g. 150° C.) to yield tough clear films.

The filtrate which contains the zinc chloride may be concentrated in any suitable apparatus by heating at about 100° C. for sufficient time to volatilize enough water so that the concentrate is again suitable for re-use in polymerizing another batch of acrylonitrile or other polymerizable material.

Example 2

| | Parts |
|---|---|
| Acrylonitrile | 8 |
| Zinc chloride | 74 |
| Water | 18 |

The acrylonitrile is mixed with a solution of the zinc chloride in the water. This solution becomes slightly warm during mixing. It is heated for about 5 hours at 90° C. and then aged for about 2 weeks at room temperature to increase the viscosity thereof.

The solution may be extruded through a nozzle or spinneret whose internal diameter is approximately 0.1 millimeter. The material is preferably extruded into warm water (70–80° C.) under a pressure of about 35–40 pounds per square inch. Under these conditions a fiber is formed and coagulated which may be drawn at approximately 40 feet per minute. Utilizing somewhat lower temperatures, i. e., 67° C. and a pressure of about 170 pounds per square inch a fiber is formed which may be drawn at about 30 feet per minute.

In order to increase the strength of the fibers produced it is desirable that they be drawn in such a manner that they will be stretched to a substantial extent. This may be conveniently done in the coagulating bath. The stretching tends to increase the strength of the fibers as compared to those which are merely extruded. Somewhat better results are obtained by allowing the fiber to contract and then subjecting it to another stretching operation.

Example 3

| | Parts |
|---|---|
| 75% solution of zinc chloride in water | 54 |
| Acrylonitrile | 25 |
| Benzoyl peroxide | 0.1 |

The acrylonitrile is dissolved in the zinc chloride solution and the mixture becomes very warm, thereby indicating the possibility of a chemical reaction between the monomeric acrylonitrile and the zinc chloride. The benzoyl peroxide is added and the mixture is heated for about ½ hour at 90–95° C. A rubbery gel is obtained. This gel may be washed with hot water until substantially free of zinc chloride solution. The resulting composition, which resembles crepe rubber when hot, may be milled on hot rolls at about 150–160° C. to produce extremely tough transparent films.

Example 4

| | Parts |
|---|---|
| Methacrolein | 25 |
| 75% solution of zinc chloride in water | 25 |

The methacrolein is dissolved in the zinc chloride solution and a few drops of t-butyl peroxide are added. A solid somewhat opaque gel is obtained after about 12 hours at room temperature. This may be oxidized to produce a water-soluble polymer.

Example 5

| | Parts |
|---|---|
| Methacrolein | 7 |
| Acrylonitrile | 7 |
| 75% solution of zinc chloride in water | 12 |

The methacrolein and acrylonitrile are dissolved in the zinc chloride solution and a few drops of t-butyl peroxide are added. Upon standing at room temperature for about 12 hours, a clear yellow viscous material is obtained which may be molded or extruded in the same general manner as described in Examples 1 and 2, respectively.

Example 6

| | Parts |
|---|---|
| Methyl acrylate | 5 |
| 80% solution of zinc chloride in water | 10 |

The methyl acrylate is dissolved in the zinc chloride solution and a few milligrams of benzoyl peroxide are added thereto. The mixture is then exposed to a source of ultra-violet light such as a mercury arc for about 2–3 hours. Optionally heat may be applied in the same general manner as described in the preceding examples in addition to, or instead of, ultra-violet radiation. The methyl acrylate polymerizes during this time and the product may be utilized in the same general manner as described in Examples 1 and 2.

Example 7

| | Parts |
|---|---|
| Vinyl acetate | 5 |
| 80% solution of zinc chloride in water | 10 |

The vinyl acetate is dissolved in the zinc chloride solution and a few milligrams of benzoyl peroxide are added thereto. The mixture is then exposed to a source of ultra-violet light such as a mercury arc for about 2–3 hours. The vinyl acetate polymerizes during this time and the product may be utilized in the same general manner as described in Examples 1 and 2.

Example 8

| | Parts |
|---|---|
| Vinyl acetate | 25 |
| 80% solution of zinc chloride in water | 100 |

The vinyl acetate is dissolved in the zinc chloride solution and a few milligrams of benzoyl peroxide are added thereto. The mixture is then exposed to a source of ultra-violet light such as a mercury arc for about 2–3 hours. The vinyl acetate polymerizes during this time and the product may be utilized in the same general manner as described in Examples 1 and 2.

Example 9

| | Parts |
|---|---|
| Methyl methacrylate | 5 |
| 80% solution of zinc chloride in water | 10 |

The methyl methacrylate is dissolved in the zinc chloride solution and a few milligrams of benzoyl peroxide are added thereto, thereby forming a slightly pink solution. The mixture is then exposed to a source of ultra-violet light such as a mercury arc for about 2–3 hours. The methyl methacrylate polymerizes during this time and the product may be utilized in the same general manner as described in Examples 1 and 2.

Example 10

| | Parts |
|---|---|
| Methyl itaconate | 5 |
| 80% solution of zinc chloride in water | 10 |

The methyl itaconate is dissolved in the zinc chloride solution and a few milligrams of benzoyl peroxide are added thereto. The mixture is then exposed to a source of ultra-violet light such as a mercury arc for about 5–8 hours. The methyl itaconate polymerizes during this time and the product may be utilized in the same general manner as described in Examples 1 and 2.

Example 11

| | Parts |
|---|---|
| Acrylonitrile | 10 |
| 80% solution of zinc chloride in water | 90 |

The acrylonitrile is dissolved in the zinc chloride solution and is polymerized by heating in the presence of a small proportion of benzoyl peroxide at about 90° C. for about an hour. A small proportion of a water-dispersible dye, e. g., Calco Brilliant Pigment Blue BN, is dispersed in the solution containing the polymerized acrylonitrile. The resulting composition is applied to cloth in the same general manner as in textile printing. The cloth is then immersed in water, thereby precipitating the resin and the color material. The treated cloth shows no leaching of the color material upon washing with soap and hot water.

In some instances, it may be desirable to copolymerize two or more unsaturated materials of the type described above or one of the type described above with some other reactive polymerizable material. For certain purposes it may be advantageous to use a substance containing an amide group, e. g., acrylamide, in order to incorporate in the polymer groups having an affinity for acidic dyes. Similarly acrylic acid might be used in the co-polymer thereby giving it an affinity for basic dyes.

Other substances which may be polymerized in the same general manner as described above are: methacrylonitrile, ethyl acrylate, propyl acrylate, butyl acrylate, ethyl methacrylate, propyl methacrylate, butyl methacrylate, allyl acetate, methallyl acetate, methacrylamide, methyl vinyl ketone, etc. Obviously various mixtures of these substances or mixtures of these substances with any of those described in the above examples may be used in the same general manner as the individual substances.

Among the zinc salts which are suitable for the solvent medium the following are preferred: zinc chloride, zinc bromide and zinc iodide. Mixtures of these are also useful. It is necessary that the solutions of the zinc salts be highly concentrated for the purposes of this invention. Accordingly, the solution should contain at least 65% of the zinc salt.

Other salts may be added after polymerization, e. g., sodium chloride, aluminum chloride, magnesium chloride, etc., in order to aid the coagulation. Various polymerizing catalysts may be substituted for all or part of the benzoyl peroxide or t-butyl peroxide, e. g., lauroyl peroxide or cocoanut oil peroxide, stearyl peroxide, aluminum chloride, etc. A polymerization catalyst is not necessary since the zinc salt acts as a catalyst itself although the reaction goes much more slowly and therefore it is generally desirable to use polymerization catalysts as indicated in the above examples.

It is to be noted that concentrated aqueous solutions of many substances which will dissolve the polymerizable materials inhibit polymerization and therefore are not suitable for use according to this invention. Examples of such substances are sodium thiocyanate, potassium thiocyanate, zinc thiocyanate, etc. These substances are such active polymerization inhibitors that in some instances they are especially useful in stabilizing substances such as acrylonitrile against polymerization. Small amounts of some of these materials, e. g., sodium thiocyanate and potassium thiocyanate, may be incorporated into potentially polymerizable materials in order to stabilize them over relatively long periods of time. These substances are particularly suitable since they may be easily separated from the polymerizable material merely by distillation leaving the salt used as a residue.

Fillers and/or pigments may be mixed with the polymeric products to produce molding compositions. Examples of these are: wood flour, wood fiber, paper dust, clay, zein, glass wool, foliated glass, mica, granite dust, silk flock, cotton flock, steel wool, carborundum, paper, cloth, sand, titanium oxide, lithopone, lead oxide, chrome yellow, lead cyanamide, zinc cyanamide, etc.

Polymeric materials made according to my invention have a wide variety of applications. The solutions produced according to the above description may be extruded to form filaments, films, ribbons or tubes. They may be used in the manufacture of woven fabric, gaskets, electrical insulation, heat insulation, etc. The polymeric materials may be molded to form gaskets, packing glands, electrical insulators, novelties, etc. The polyacrylonitrile materials are particularly suitable for such purposes wherein it is desirable to have materials which are resistant to grease, organic solvents, water, heat, etc.

Obviously many modifications and variations may be made in the processes and compositions described above without departing from the spirit and scope of the invention as defined in the appended claims.

I claim:

1. A process which comprises polymerizing a substance selected from the group consisting of compounds of the following general formula and isomers thereof:

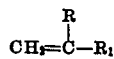

where R is selected from the group consisting of hydrogen and methyl, where $R_1$ is selected from the group consisting of —CN and

where $R_2$ is selected from the group consisting of hydrogen, alkyl, alkaryl, cycloalkyl and

and where $R_3$ and $R_4$ are selected from the group consisting of hydrogen and organic radicals, in an aqueous solution containing at least 65% of a zinc salt, said zinc salt being selected from the group consisting of zinc chloride, zinc bromide and zinc iodide.

2. A process which comprises polymerizing acrylonitrile in an aqueous solution containing at least 65% of a zinc salt, said zinc salt being selected from the group consisting of zinc chloride, zinc bromide and zinc iodide.

3. A process which comprises polymerizing acrylonitrile in an aqueous solution containing at least 65% of zinc chloride.

4. A process which comprises polymerizing acrylonitrile in an aqueous solution containing at least 65% of zinc bromide.

5. A process which comprises polymerizing acrylonitrile in an aqueous solution containing at least 65% of zinc iodide.

6. A composition produced according to the process of claim 3 comprising an aqueous solution containing at least 65% of zinc chloride and at least 10% of polyacrylonitrile.

7. A composition produced according to the process of claim 1 and comprising an aqueous solution containing at least 65% of zinc chloride and at least 10% of polymer of said substance mentioned in claim 1.

EDWARD L. KROPA.